United States Patent
Yarus et al.

(10) Patent No.: US 10,145,228 B2
(45) Date of Patent: Dec. 4, 2018

(54) PROBABILISTIC METHODOLOGY FOR REAL TIME DRILLING

(71) Applicant: Landmark Graphics Corporation, Houston, TX (US)

(72) Inventors: Jeffrey Marc Yarus, Houston, TX (US); Rae Mohan Srivastava, Toronto (CA); Kalyan Saikia, Houston, TX (US); Jordan Michael Yarus, Houston, TX (US)

(73) Assignee: Landmark Graphics Corporation, Houston, TX (US)

( * ) Notice: Subject to any disclaimer, the term of this patent is extended or adjusted under 35 U.S.C. 154(b) by 279 days.

(21) Appl. No.: 14/891,315

(22) PCT Filed: Aug. 13, 2013

(86) PCT No.: PCT/US2013/054755
§ 371 (c)(1),
(2) Date: Nov. 13, 2015

(87) PCT Pub. No.: WO2015/023266
PCT Pub. Date: Feb. 19, 2015

(65) Prior Publication Data
US 2016/0145991 A1      May 26, 2016

(51) Int. Cl.
*E21B 47/02*     (2006.01)
*E21B 44/00*     (2006.01)
*E21B 7/04*      (2006.01)
*E21B 47/022*    (2012.01)
*E21B 49/00*     (2006.01)
(Continued)

(52) U.S. Cl.
CPC ............... *E21B 44/00* (2013.01); *E21B 7/04* (2013.01); *E21B 47/02* (2013.01); *E21B 47/022* (2013.01); *E21B 49/003* (2013.01); *G05B 13/04* (2013.01); *G06N 7/005* (2013.01)

(58) Field of Classification Search
None
See application file for complete search history.

(56) References Cited

U.S. PATENT DOCUMENTS 9,182,517 B1 *  11/2015  Selman ................... G01V 5/04
2002/0177955 A1  11/2002  Jalali et al.
2005/0211468 A1   9/2005  Veeningen et al.
(Continued)

OTHER PUBLICATIONS

International Search Report and Written Opinion of the Searching Authority, dated May 13, 2014; 10 pages; Korean International Searching Authority.

*Primary Examiner* — Cheung Lee (57) ABSTRACT

The disclosed embodiments include a method, apparatus, and computer program product configured to provide a probabilistic approach for real time drilling. In particular, the disclosed embodiments are configured to obtain real-time data gathered during the drilling operation to update a probability model of a formation that is used in determining whether to alter a direction of a drill path. The disclosed embodiments may be configured to provide a notification to a user indicating or suggesting that certain adjustments be made to the drill path based on the updated probability model. Additionally, the disclosed embodiments may be configured to automatically make the adjustments to the drill path based on the updated probability model.

20 Claims, 8 Drawing Sheets

(51) Int. Cl.
  *G05B 13/04*      (2006.01)
  *G06N 7/00*       (2006.01)

(56) References Cited

U.S. PATENT DOCUMENTS

| | | |
|---|---|---|
| 2008/0179094 A1 | 7/2008 | Repin et al. |
| 2009/0205867 A1 | 8/2009 | Reckmann et al. |
| 2013/0161096 A1 | 6/2013 | Benson et al. |

* cited by examiner

PROBABILISTIC METHODOLOGY FOR REAL TIME DRILLING

CROSS-REFERENCE TO RELATED APPLICATIONS

This application is a U.S. National Stage patent application of International Patent Application No. PCT/US2013/054755, filed on Aug. 13, 2013, the benefit of which is claimed and the disclosure of which is incorporated herein by reference in its entirety.

BACKGROUND OF THE INVENTION

1. Field of the Invention

The present disclosure relates generally to the recovery of subterranean deposits and more specifically to methods and systems for utilizing a probabilistic approach for real time drilling.

2. Discussion of the Related Art

As the process for recovering oil and gas becomes more complex, the importance of reducing delay and/or other operational mistakes increases because even a minor delay or mistake may have a major effect on production cost and overall profits.

Accordingly, the disclosed embodiments seek to improve well production by providing, among other things, a system and method configured to improve the well drilling process by using data gathered during the drilling operation to generate a probability model for automatically making adjustments in a drill path.

BRIEF DESCRIPTION OF THE DRAWINGS

Illustrative embodiments of the present invention are described in detail below with reference to the attached drawing figures, which are incorporated by reference herein and wherein.

The illustrated figures are only exemplary and are not intended to assert or imply any limitation with regard to the environment, architecture, design, or process in which different embodiments may be implemented.

DETAILED DESCRIPTION

It is often the case that the trajectory of a drill path should fall in between two geological layers defining a target zone in which there is a drilling objective. Frequently, however, the exact shape of the geological layers is not known, thus the trajectory is speculative and requires updating of the geological layers as new information becomes available from a well drilling along the path trajectory. This updating process attempts to modify the well path with new information about the geological surfaces as the well is drilled to ensure its position within a target zone, or sweet spot. A change in the geologic surface geometry implies that the target zone is conformable to the geologic surfaces that define it. While it may be that conformable geological relationships are often present, it is not always the case. Additionally, the new information for updating may be sparse or inaccurate and may cause the generation of incorrect shapes in the critical geological surfaces and the resulting modified well path.

Accordingly, the disclosed embodiments propose the use of an earth model grid or mesh comprising a plurality of cells/nodes or tessellations, each containing a variety of properties and a probability of success parameter as a backdrop to real-time drilling. In some embodiments, the cells or tessellations may all be the same shape and same size, may be the same shape, but have different sizes, or may comprise of various shapes of varying sizes. For ease of reference, the term "cell" or "cells" as used herein and in the claims means a node, cell, or tessellation in accordance with any of the above embodiments.

Additionally, as used herein, reference to formation modeling, earth modeling, and/or reservoir modeling means computer modeling of at least a portion of a formation that includes a reservoir of interest. A reservoir is the porous and permeable rocks that contain commercial deposits of hydrocarbons within a formation. The earth model is a static model that provides geoscientists and engineers with size, shape, orientation, composition, and internal arrangement of a reservoir volume or other volume in the subsurface in which there can drilling targets.

In accordance with the disclosed embodiments, the probability of success parameter for each cell is used to perform real-time modification of a drill path with the objective of maintaining an optimal position within a target zone or sweet spot. The target zone can be identified based on a variety of methods. For example, in some embodiments, such methods may include the accumulation of neighboring cells forming a sub-volume that have certain optimal characteristics such as high porosity, permeability, and brittleness. These characteristics may be geological, petrophysical, mechanical, or any other property desired. They may be expressed as continuous or non-continuous numerical properties including nominal, ordinal, interval, or ratio. In some embodiments, the characteristics may be expressed as probabilistic or deterministic.

A well path can be designed which intersects the earth model volume intersecting the various cells. In one embodiment, the objective of the well is to intersect as many cells that have optimal characteristics that occur in the target zone. Following this process, an actual well can be drilled in accordance with this well path trajectory. As the well is drilled, new information on the actual properties encountered in a given cell is compared to the model cell. If the value is similar (e.g., within a defined tolerance), the model is deemed accurate for that cell, and no change is made. If the value is dissimilar, the model is updated either by replacing the new value in the model cell, or in some embodiments, by a more sophisticated method of interpolation or simulation such as kriging or conditional simulation.

In certain embodiments, probabilities can be assessed and the value of similarity determined based on changes in the probability. An example of this would be the use of multiple realizations of the earth model where each realization is different, but equally likely. For instance, in one embodiment, one earth model would consist of multiple realizations, wherein each cell of the earth model would have multiple possible values. In turn, each cell along the drill path could be evaluated to determine whether the value was exceeded, under exceeded, or fell within a defined range of values. Whether the new value derived from drilling meets or does not meet the tolerances defined, the old value is replaced with the real value and the model updated. The projected well path may then be modified/updated to intersect the cells as close to the original projection that have the most optimal values. In some cases, that would mean the well path would be required to change directions based on the updated information. Additionally, in some embodiments, the target zone may change based on the updated information.

In certain embodiments, as an individual cell is evaluated, the updating of the earth model would involve high grading the set of realizations to retain only those that predicted values or probabilities that fell within the acceptable tolerances. Then, a new set of realizations are produced with previously updated values.

One major advantage of this innovation is that it does not require the assumption of geological conformity. If the updated drill path is in fact determined to be conformable, then the shape of the drill path can be used to directly update the geological bounding surfaces. If not, the shape of the surfaces will not restrict or require the trajectory of the well path to a geometry that would be incorrect. This would be appropriate when target zones have evolved independently of the geological surfaces such as in mineralized zones, fractured zones, diagenetically altered zones, or any other reason. Further, in this embodiment, a projected drill path can evolve to where it is parallel to a geological formation top in one portion of the earth model and parallel to geological formation bottom, or some reference surface, in another portion. The updating of the shape of the geological surfaces can evolve separately and simultaneously from the target zone and information related to surface geometry.

For a better understanding of the disclosed embodiments and advantages thereof, reference is made to FIGS. 1-9 of the drawings, like numerals being used for like and corresponding parts of the various drawings. The systems, computer program products, and methods described herein provide a probabilistic approach for real time drilling that uses data gathered during the drilling operation to generate a probability model for automatically making adjustments in a drill path. In accordance with the disclosed embodiments, information gathering may be performed using tools that are delivered downhole via wireline or alternatively using tools that are coupled to or integrated into a drill string of a drilling rig. As will be further described below in referenced to the figures, wireline-delivered tools are suspended from a wireline that is electrically connected to control and logging equipment at the surface of the well. The tools may be deployed by first removing the drill string and then lowering the wireline and tools to an area of interest within the formation. This type of testing and measurement is often referred to as "wireline formation testing (WFT)." The tools associated with WFT may be used to measure pressure and temperature of formation and wellbore fluids.

In certain embodiments, instead of wireline deployment, measurement tools are coupled to or integrated with the drill string. In these situations, the added expense and time of removing the drill string prior to measurement of important formation properties is avoided. This process of "measurement while drilling (MWD)" uses measurement tools to determine formation and wellbore temperatures and pressures, as well as the trajectory and location of the drill bit. The process of "logging while drilling (LWD)" uses tools to determine additional formation properties such as permeability, porosity, resistivity, and other properties. The information obtained by MWD and LWD enable real-time decisions to be made to alter ongoing drilling operations.

Figure 1:
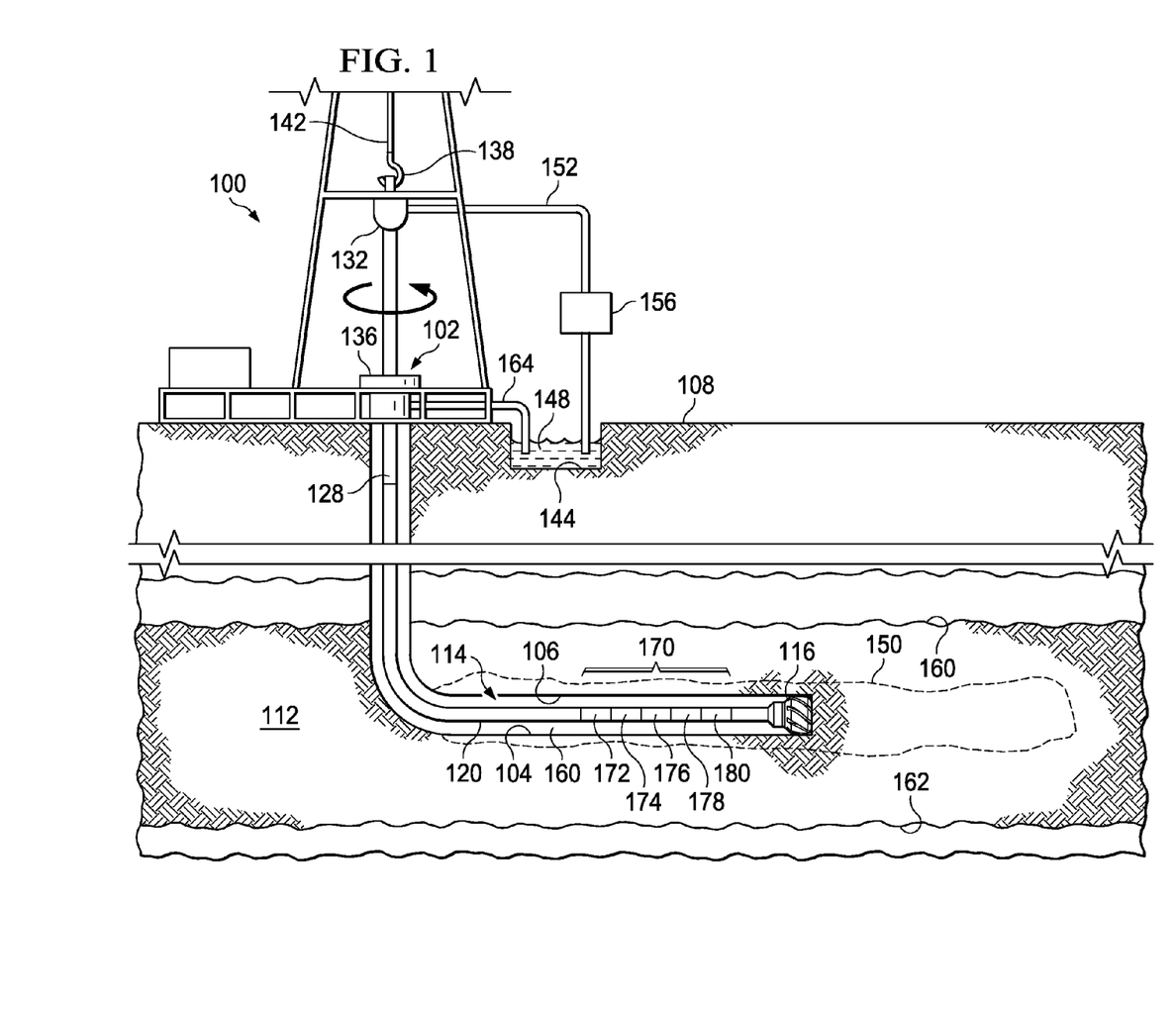
FIG. 1 illustrates a schematic view of a well in which a probabilistic approach for real-time drilling system is deployed in a logging while drilling assembly in accordance with the disclosed embodiments.

For instance, with reference now to FIG. 1, a schematic view of a well 102 in which a probabilistic approach for real-time drilling control system 100 is deployed in a LWD assembly in accordance with the disclosed embodiments. In the depicted embodiment, the well 102 is illustrated onshore with a set of measurement tools 170 being deployed in an LWD assembly 114. The well 102 includes a wellbore 104 that extends from a surface 108 of the well 102 to or through a subterranean formation 112. The well 102 is formed by a drilling process, in which a drill bit 116 is turned by a drill string 120 that extends from the drill bit 116 to the surface 108 of the well 102. The drill string 120 may be made up of one or more connected tubes or pipes, of varying or similar cross-section. The drill string may refer to the collection of pipes or tubes as a single component, or alternatively to the individual pipes or tubes that comprise the string. The term drill string is not meant to be limiting in nature and may refer to any component or components that are capable of transferring rotational energy from the surface of the well to the drill bit. In several embodiments, the drill string 120 may include a central passage disposed longitudinally in the drill string and capable of allowing fluid communication between the surface of the well and downhole locations.

At or near the surface 108 of the well, the drill string 120 may include or be coupled to a kelly 128. The kelly 128 may have a square, hexagonal or octagonal cross-section. The kelly 128 is connected at one end to the remainder of the drill string and at an opposite end to a rotary swivel 132. The kelly passes through a rotary table 136 that is capable of rotating the kelly and thus the remainder of the drill string 120 and drill bit 116. The rotary swivel 132 allows the kelly 128 to rotate without rotational motion being imparted to the rotary swivel 132. A hook 138, cable 142, traveling block (not shown), and hoist (not shown) are provided to lift or lower the drill bit 116, drill string 120, kelly 128 and rotary swivel 132. The kelly and swivel may be raised or lowered as needed to add additional sections of tubing to the drill string 120 as the drill bit 116 advances, or to remove sections of tubing from the drill string 120 if removal of the drill string 120 and drill bit 116 from the well 102 are desired.

A reservoir 144 is positioned at the surface 108 and holds drilling mud 148 for delivery to the well 102 during drilling operations. A supply line 152 is fluidly coupled between the reservoir 144 and the inner passage of the drill string 120. A pump 156 drives fluid through the supply line 152 and downhole to lubricate the drill bit 116 during drilling and to carry cuttings from the drilling process back to the surface 108. After traveling downhole, the drilling mud 148 returns to the surface 108 by way of an annulus 160 formed between the drill string 120 and the wellbore 104. At the surface 108, the drilling mud 148 is returned to the reservoir 144 through a return line 164. The drilling mud 148 may be filtered or otherwise processed prior to recirculation through the well 102.

In one embodiment, the set of measurement tools 170 is positioned downhole to measure, process, and communicate data regarding the physical properties of the subterranean formation 112 such as, but not limited to, permeability, porosity, resistivity, and other properties. The measurement tools 170 may also provide information about the drilling process or other operations occurring downhole. In some embodiments, the data measured and collected by the set of measurement tools 170 may include, without limitation, pressure, temperature, flow, acceleration (seismic and acoustic), strain data, and location and trajectory data of a drill bit 116.

The set of measurement tools 170 may include a plurality of tool components that are coupled to one another by threads, couplings, welds, or other means. In the illustrative embodiment depicted in FIG. 2, the set of measurement tools 170 includes a transceiver unit 172, a power unit 174, a sensor unit 176, a pump unit 178, and a sample unit 180. Each of the individual components may include control electronics such as processor devices, memory devices, data storage devices, and communications devices, or alternatively a centralized control unit may be provided that communicates with and controls one or more of the individual components.

Figure 2:
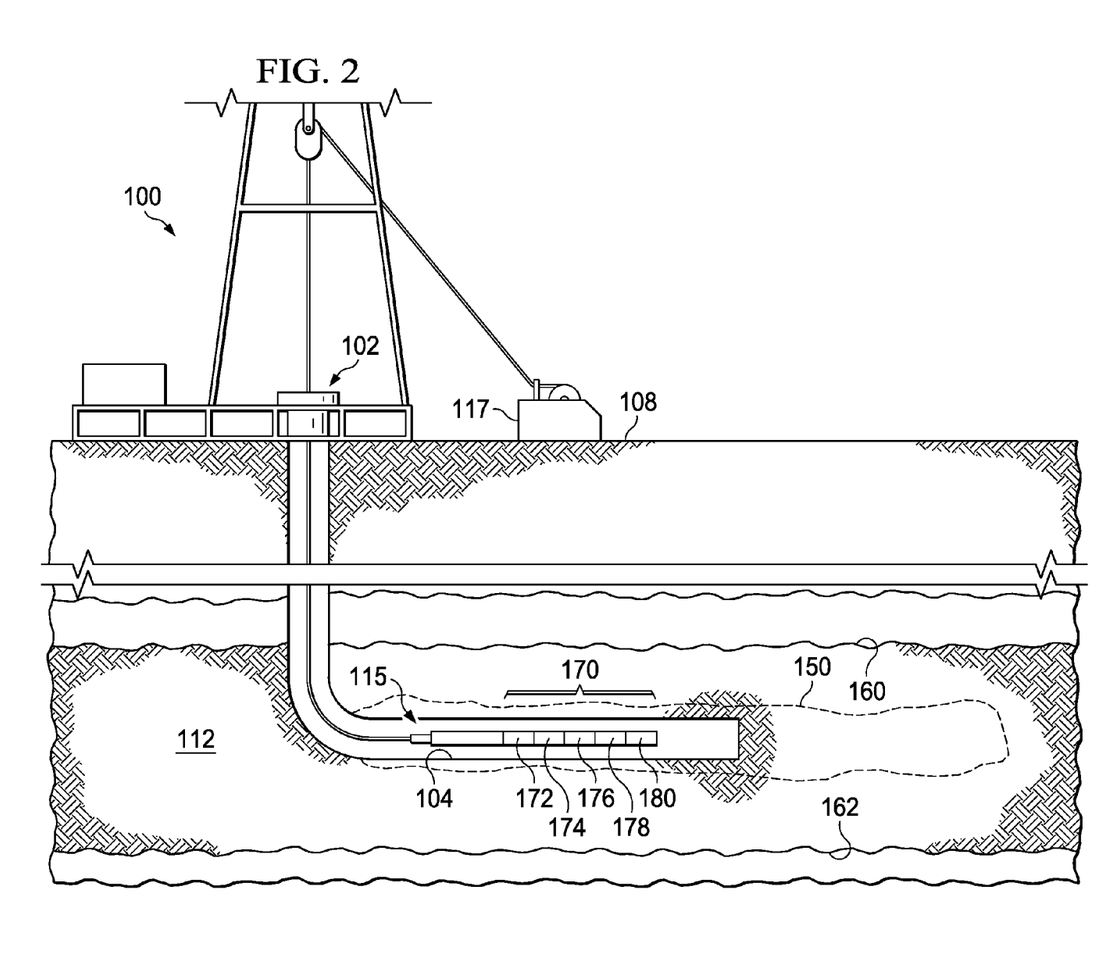
FIG. 2 illustrates a schematic view of a well in which the probabilistic approach for real-time drilling system of FIG. 1 is deployed in a wireline or wireline formation testing assembly in accordance with the disclosed embodiments.

The transceiver unit 172 is capable of communicating with the control system 100 or similar equipment at or near the surface 108 of the well 102. Communication between the transceiver unit 172 and the control system 100 may be by wire if the drill string 120 is wired or if a wireline evaluation system is deployed. Alternatively, the transceiver unit 172 and control system 100 may communicate wirelessly using mud pulse telemetry, electromagnetic telemetry, or any other suitable communication method. Data transmitted by the transceiver unit 172 may include without limitation sensor data or other information, as described above, measured by the various components of the set of measurement tools 170.

The power unit 174 may be hydraulically powered by fluid circulated through the well or by fluid circulated or pressurized in a downhole, closed-loop hydraulic circuit. Alternatively, the power unit 174 may be an electrical power unit, an electro-mechanical power unit, a pneumatic power unit, or any other type of power unit that is capable of harnessing energy for transfer to powered devices. The power unit 174 may provide power to one or more of the components associated with the set of measurement tools 170, or alternatively to one or more other downhole devices. For example, in some embodiments, the power unit 174 may provide power to the pump unit 178. A pump associated with the pump unit 178 may be used to move fluids within or between the components of the set of measurement tools 170 as explained in more detail below.

The sensor unit 176 may also receive power from the power unit 174 and may contain a number of sensors such as pressure sensors, temperature sensors, seismic sensors, acoustic sensors, strain gauges, inclinometers, or other sensors. Additionally, the sample unit 180 may gather samples of the subterranean formation 112 or reservoir fluids (typically hydrocarbons) for enabling further evaluation of the drilling operations and production potential.

As will be further described, the information gathered by the set of measurement tools 170 during the drilling process allows the control system 100 to update a probability model for automatically making adjustments in a drill path.

While the set of measurement tools 170 is illustrated as a part of the drill string 120 in FIG. 1, in other embodiments, as depicted in FIG. 2, the set of measurement tools 170 may be lowered into the well by wireline either through the central passage of the drill string 120, or if the drill string 120 is not present, directly through the wellbore 104. In this embodiment, set of measurement tools 170 may instead be deployed as part of a wireline assembly 115, either onshore or off-shore. The wireline assembly 115 includes a winch 117 to lift and lower a downhole portion of the wireline assembly 115 into the well.

Figure 3:
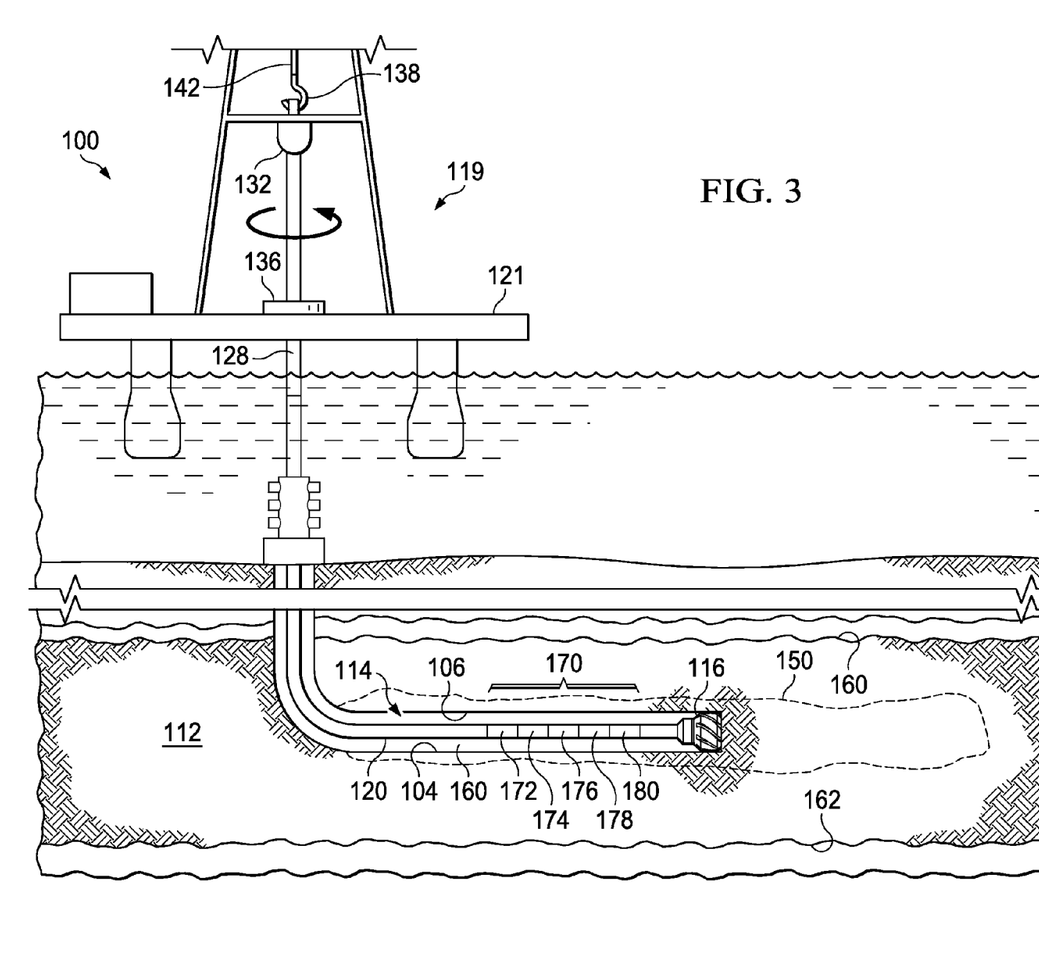
FIG. 3 illustrates a schematic view of a subsea well in which the probabilistic approach for real-time drilling system of FIG. 1 is deployed in accordance with the disclosed embodiments.

In still another embodiment, as depicted in FIG. 3, the control system 100 and the set of measurement tools 170 may similarly be deployed in a sub-sea well 119 accessed by a fixed or floating platform 121.

Figure 4:
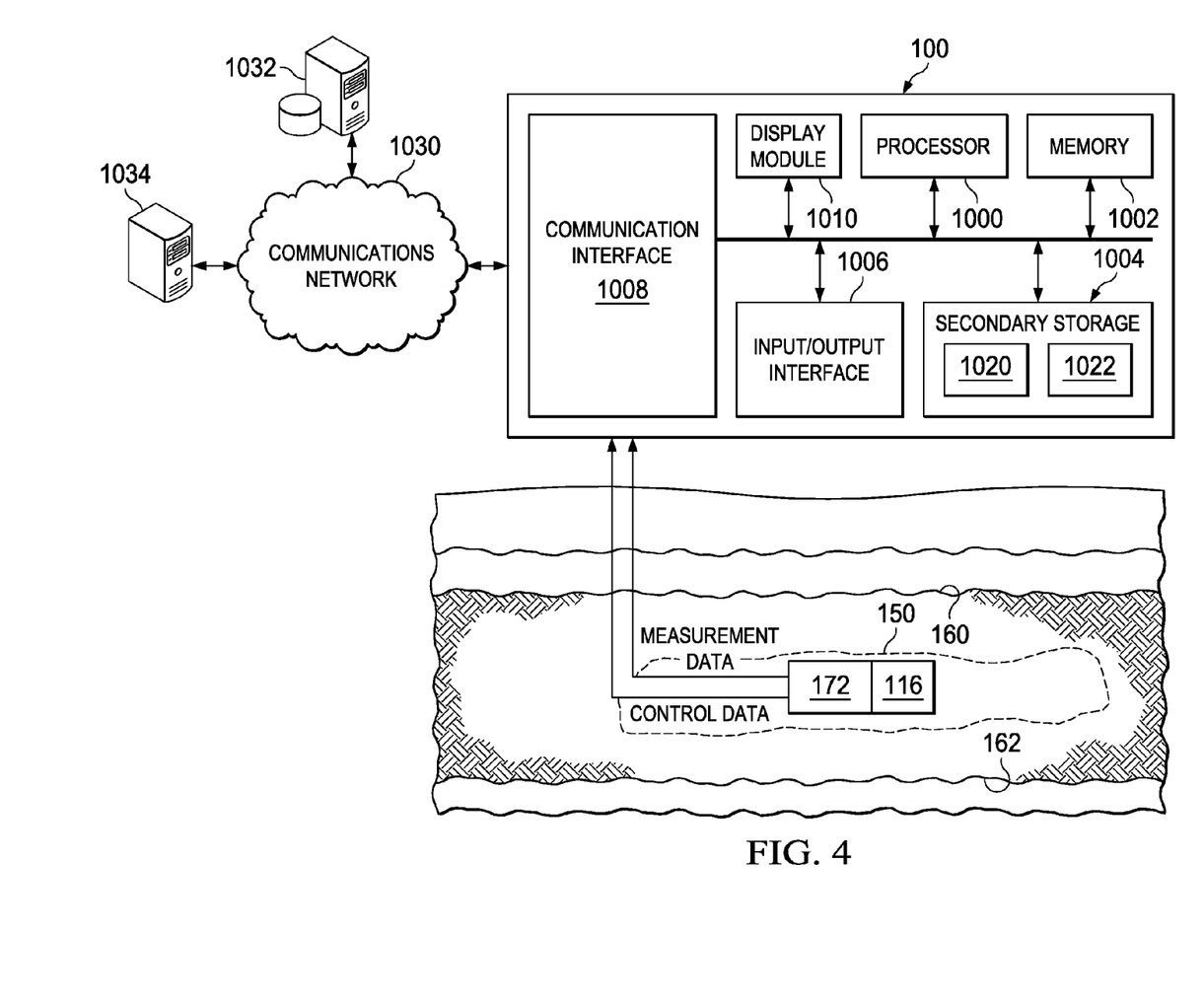
FIG. 4 is a block diagram illustrating one embodiment of a probabilistic approach for real-time drilling system.

FIG. 4 is a block diagram illustrating one embodiment of the control system 100 for implementing the features and functions of the disclosed embodiments. The control system 100 includes, among other components, a processor 1000, memory 1002, secondary storage unit 1004, an input/output interface module 1006, and a communication interface module 1008. The processor 1000 may be any type or any number of single core or multi-core processors capable of executing instructions for performing the features and functions of the disclosed embodiments.

The input/output interface module 1006 enables the control system 100 to receive user input (e.g., from a keyboard and mouse) and output information to one or more devices such as, but not limited to, printers, external data storage devices, and audio speakers. The control system 100 may optionally include a separate display module 1010 to enable information to be displayed on an integrated or external display device. For instance, the display module 1010 may include instructions or hardware (e.g., a graphics card or chip) for providing enhanced graphics, touchscreen, and/or multi-touch functionalities associated with one or more display devices.

Main memory 1002 is volatile memory that stores currently executing instructions/data or instructions/data that are prefetched for execution. The secondary storage unit 1004 is non-volatile memory for storing persistent data. The secondary storage unit 1004 may be or include any type of internal or external data storage component such as a hard drive, a flash drive, or a memory card. In one embodiment, the secondary storage unit 1004 stores the computer executable code/instructions and other relevant data for enabling a user to perform the features and functions of the disclosed embodiments.

For example, in accordance with the disclosed embodiments, the secondary storage unit 1004 may permanently store, among other data, the executable code/instructions of a probabilistic approach for real time drilling algorithm 1020. The instructions associated with the probabilistic approach for real time drilling algorithm 1020 is loaded from the secondary storage unit 1004 to main memory 1002 during execution by the processor 1000 for performing the features of the disclosed embodiments.

In some embodiments, the secondary storage unit 1004 may also include executable code/instructions associated with a formation/reservoir modeling application, such as, but not limited to, DecisionSpace® Earth Modeling software 1022 available from Landmark Graphics Corporation. For instance, DecisionSpace® Earth Modeling software includes executable instructions for creating both 2D and 3D earth modeling in accordance with the disclosed embodiments.

The communication interface module 1008 enables the control system 100 to communicate with the communications network 1030. For example, the network interface module 1008 may include a network interface card and/or a wireless transceiver for enabling the control system 100 to send and receive data through the communications network 1030 and/or directly with other devices.

The communications network 1030 may be any type of network including a combination of one or more of the following networks: a wide area network, a local area network, one or more private networks, the Internet, a telephone network such as the public switched telephone network (PSTN), one or more cellular networks, and wireless data networks. The communications network 1030 may include a plurality of network nodes (not depicted) such as routers, network access points/gateways, switches, DNS servers, proxy servers, and other network nodes for assisting in routing of data/communications between devices.

For example, in one embodiment, the control system 100 may interact with one or more servers 1034 or databases 1032 for performing the features of the disclosed embodiments. For instance, the control system 100 may query the database 1032 for well log information or other geophysical data for generating an initial model of a formation and reservoir in accordance with the disclosed embodiments. Further, in certain embodiments, the control system 100 may act as a server system for one or more client devices or a peer system for peer to peer communications or parallel processing with one or more devices/computing systems (e.g., clusters, grids).

In addition, control system 100 may communicate data to the transceiver unit 172 such as control data to direct the operation of the various components of the set of measurement tools 170 and/or to alter direction of the drill path based on a change in a probability model in accordance with the disclosed embodiments. As described above, the control system 100 is also configured to receive real-time measurement data for the set of measurement tools 170 during the drilling process for updating the probability model.

Still, in certain embodiments, the communication path between the control system 100 and the transceiver unit 172 may involve one or more middleware devices. For instance, in some embodiments, the control system 100 may be a remote system that communicates with a local system located at a well site over the communications network 1030, the local system being in direct communication with the transceiver unit 172. In other embodiments, the transceiver unit 172 may be in direct communication with one or more devices located on the communications network 1030 as opposed to communicating with a local system at the well site.

Figure 5:
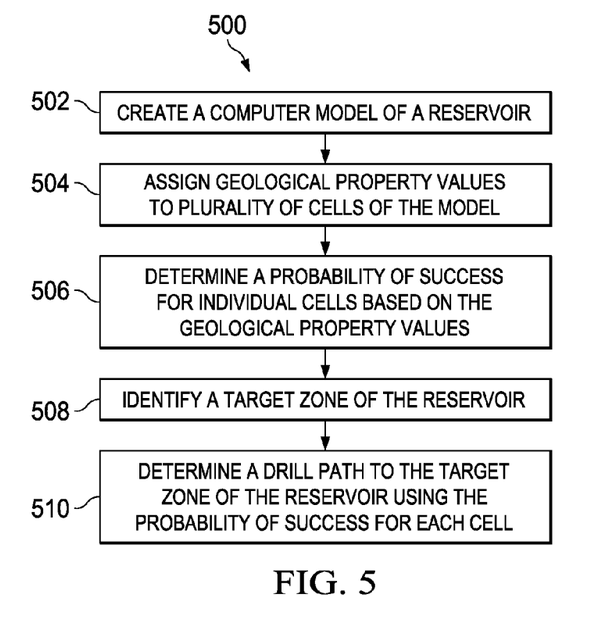
FIG. 5 is a flowchart depicting a computer-implemented method for determining an initial drill path in accordance with the disclosed embodiments.
Figure 6:
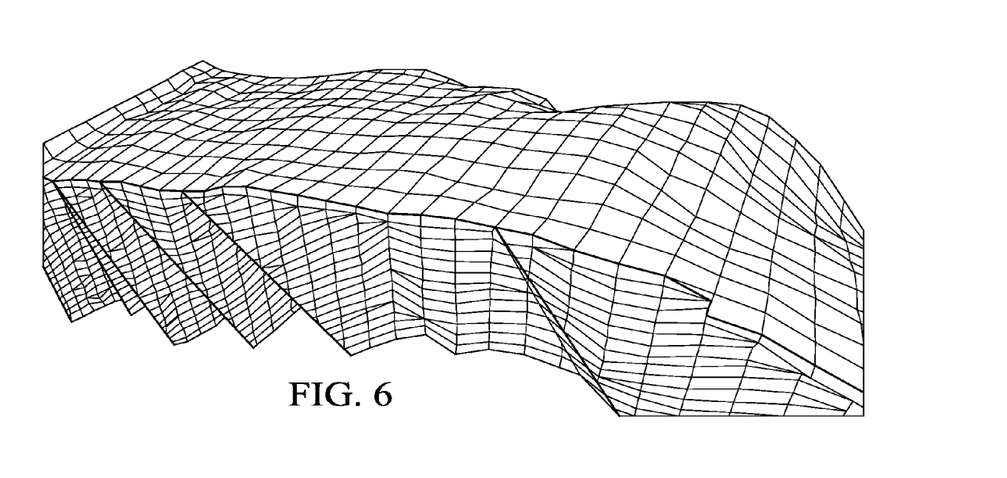
FIG. 6 illustrates a computer model of a formation in accordance with the disclosed embodiments.

With reference now to FIG. 5, a flowchart depicting a computer-implemented method 500 for determining an initial drill path in accordance with the disclosed embodiments is presented. The computer implemented method 500 begins by creating a computer model of a formation at step 502. As an illustrative example only, FIG. 6 illustrates one embodiment of a computer model of a formation in accordance with the disclosed embodiments. In one embodiment, the earth model of the formation may be created using a modeling software application such as, but not limited to, Decision-Space® Earth Modeling software 1022 available from Landmark Graphics Corporation. The earth model is used to express the various properties in a formation for a conventional or unconventional reservoir. Conventional reservoirs typically permit oil or natural gas to flow readily into wellbores. Whereas in unconventional reservoirs (e.g., shale gas or coal bed methane), the gas might be distributed throughout the reservoir at the basin scale, in which buoyant forces or the influence of a water column on the location of hydrocarbons within the reservoir are not significant.

In one embodiment, the earth model properties include properties that describe the size, shape, orientation, internal arrangement, and composition of the formation and reservoir. For instance, in certain embodiments, the process retrieves data from one or more sources for building the earth model. For example, in certain embodiments, the process retrieves data, such as, but not limited to, well log information, from an OpenWorks® database (also available from Landmark Graphics Corporation) so all subsurface data can be dynamically integrated in a true shared earth model.

As illustrated in FIG. 6, in some embodiments, part of the process for creating the earth model includes selecting a particular framework and performing stratigraphic modeling, which involves creating a grid that is used to model the sub-horizontal surfaces and seams. The grid may be a structured cellular grid (i.e., consistent geometry) or an unstructured mesh having no particular geometry. Each of the cells or nodes in the grid represents micro-regions of the formation and reservoir. Non-limiting examples of cell size may be 100-150 m×100-150 m×1-2 m, or for a more define model the cell size may be 50 m×50 m×0.5 m.

In certain embodiments, the process may also include constraining the model with respect to depositional facies. This involves assigning geological property values to each of the plurality of cells of the model at step 504. In one embodiment, the geological property values include a porosity value, a permeability value, and a brittleness value. This information may be gathered from initial well logs or other testing data, and/or may include data gathered from previously drilled wells. Thus, every node in the model is assigned one or more property values that express the quality of the formation/reservoir at that particular location. In certain embodiments, there may be hundreds of realization for these property values for a particular reservoir model.

The process then determines a probability of success for each of the cells of the earth model (referred to herein as a probability model) based on the geological property values at step 506. For instance, for every cell in the model, there is a probability of encountering a predetermined range of values for the geological properties (e.g., porosity, permeability, and brittleness) that are good indicators of success. For example, if the geological property is porosity, the process may classify cells having 18-22% porosity as success. In one embodiment, the process combines all the properties of the cell for generating a single probabilistic value.

As described above, in certain embodiments, steps 604 and 606 may be repeated multiple times using varying similar geological property values (i.e., multiple realizations) that are likely to occur. Thus, in these embodiments, the one earth model would consist of multiple realizations, wherein each cell of the earth model would have multiple possible values. As an example, in one embodiment, 100 realizations may be performed. Thus, in this embodiment, each cell along the drill path may have a probability of success parameter that indicates how many times out of 100 that the cell has characteristics, which may be geological, petrophysical, mechanical, or any other desired properties, that falls within a defined range of values that are predetermined to be characteristic of a good cell.

Once the model has reliable facies and rock properties, the process filters/analyzes the data to identify areas of greatest potential. For example, in one embodiment, the process may run volumetric analysis, Stock Tank Original Oil in Place (STOOIP) analysis, or assess P10, P50, or P90 uncertainty. STOOIP refers to the total hydrocarbon content of an oil reservoir that is in place before the commencement of production. P90 refers to proved reserves, P50 refers to proved and probable reserves and P10 refers to proved, probable and possible reserves. Based on the analysis testing, the process at step 508 identifies a sweet spot or target zone 150 of the reservoir. For example, the sweet spot in a shale reservoir may be based on analysis of source-rock richness or thickness, natural fractures, or by other factors, using geological data such as core analysis, well log data, or seismic data.

Figure 8:
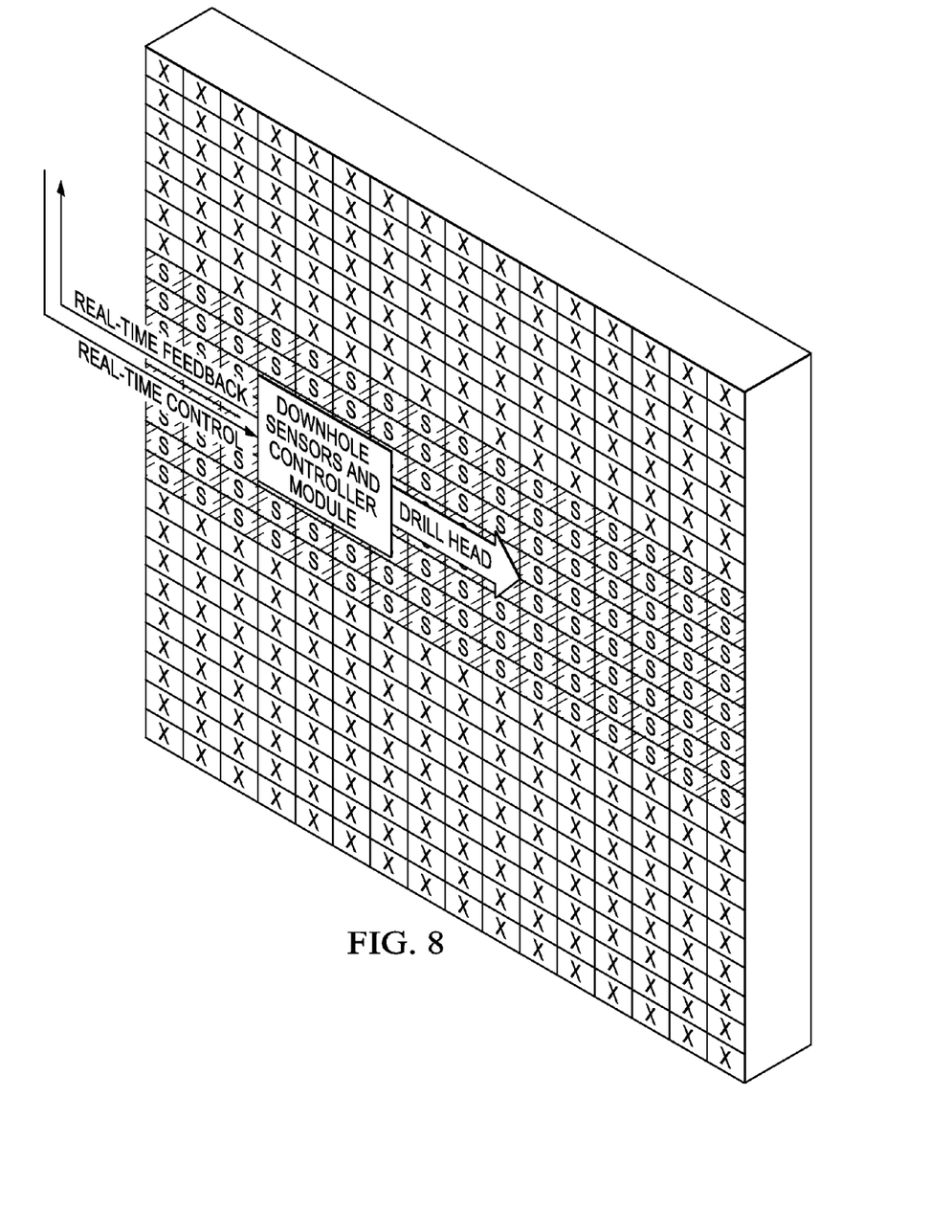
FIG. 8 is a schematic drawing that illustrates a probability model for determining an initial drill path of a formation in accordance with the disclosed embodiments.

At step 510, using the probability model, the process, determines an initial drill path corresponding to the determined target zone of the reservoir. As an example, FIG. 8 illustrates a portion of the probability model corresponding to an initial drill path of a formation in accordance with the disclosed embodiments. In some embodiments, the drill path may be determined based on the highest probability of a next occurring cell along a path, a highest probability of a cluster of cells along a path, and/or based on an overall path having a highest probability of success to the determined target zone. As an alternative embodiment, instead of or in addition to a probability value (e.g., 98% of the time the cell has qualities that indicate success) being assigned to a cell, a boolean success value may be assigned to a cell. For example, in one embodiment, if the probability value of a cell is higher than a predetermined value (e.g., higher than 90%), the cell is assigned a boolean success value of true (S), else the boolean success value of the cell is assigned false (X) as shown in FIG. 8.

Figure 7:
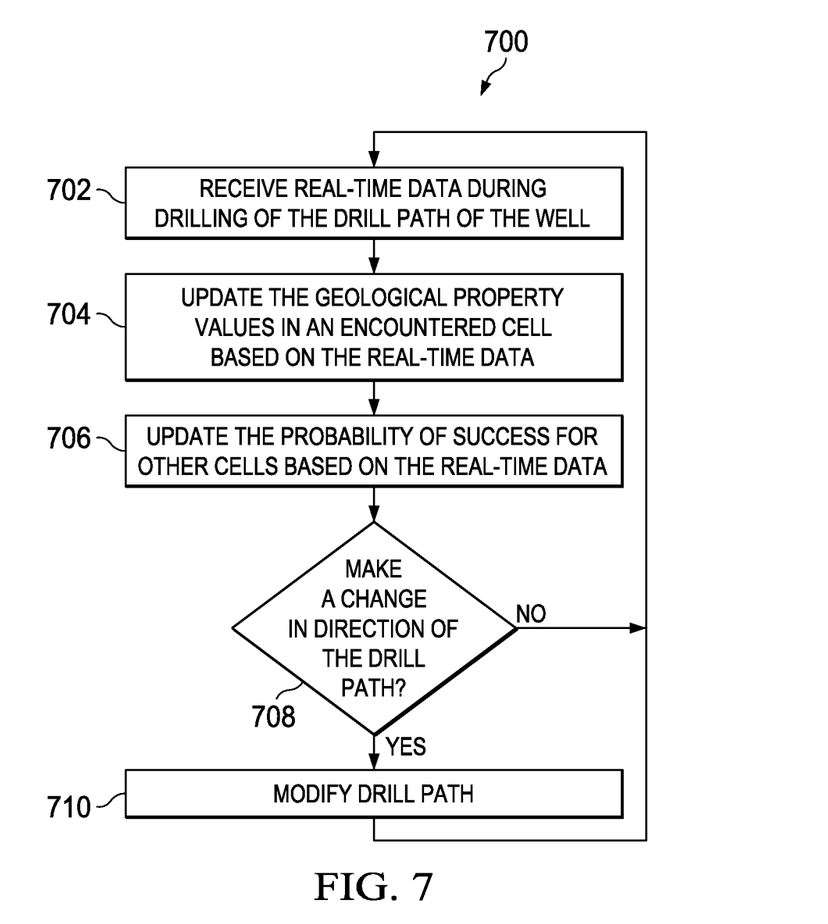
FIG. 7 is a flowchart depicting a computer-implemented method for modifying a drill path based on real-time data in accordance with the disclosed embodiments.

Once the initial drill path is determined and the actual drilling process begins, FIG. 7 illustrates a process 700 for modifying the drill path based on real-time data gathered during the drilling process in accordance with the disclosed embodiments. FIG. 7 begins by receiving real-time data during drilling of the drill path of the well at step 702. The real-time data may be obtained during the drilling process as described above and illustrated in FIGS. 1-4. However, any process or system for obtaining real-time data during the drilling process may be utilized with the disclosed embodiments.

In certain embodiments, the real-time data includes information pertaining to permeability, porosity, resistivity, brittleness and other geological properties of the reservoir at a particular location along the drill path, preferably as close to the drill bit 116 as possible. The real-time data may also include information regarding formation and wellbore temperatures and pressures, as well as the trajectory and location of the drill bit 116.

In one embodiment, the real-time data includes information for updating a bounding surface that straddles the top 160 and/or the base 162 of the objective formation that defines the interval of the objective formation. For instance, slightly before the well path begins to turn horizontally during the drilling process, the drill path will cross the top of the objective formation. In one embodiment, the process captures this location value as the initial value for the location of the top bounding surface 160. As drilling continues, the process captures additional data/values at other locations for the top 160 and maybe bottom 162 surfaces of the formation as the drill path may leave the formation. In one embodiment, the process may determine whether the target zone geologically conforms to one or more of the bounding surfaces based on the captured data associated with bounding surfaces or whether the target zone geologically conforms to some reference surface. In certain embodiments, once the process determines whether the target zone geologically conforms to one or more of the bounding surfaces or a reference surface, the process may be configured to provide a notification to the user of the determined conformity.

In some embodiments, the process may utilize this information to confirm the accuracy of data associated with gamma ray logging, which is a method of measuring naturally occurring gamma radiation to characterize the rock or sediment in a borehole or drill hole, and whether the gamma rays are conformable to the top and/or bottom bounding surfaces. Still, in certain embodiments, the process may utilize the real-time to update the location and/or properties of the sweet spot/zone of interest.

At step 704, the process updates the geological property values in an encountered cell based on the real-time data. Based on the updated geological property values, the process at step 706, updates the probability of success for the other cells within the model, or a portion of cells within the model (e.g., only updates the probability of success for cells along and around the current drill path). In certain embodiments, the degree or number of cells that are updated within the model or along the drill path may be user-defined. In accordance with the disclosed embodiments, although certain geological parameter values may change (e.g., porosity is 19% instead of initially the determined 18%), the probability of success for the cell may not change as the porosity value is still within a predetermined successful range (e.g., 18%-21%) or the cumulative geological property values for a given cell has not altered its probability of success.

In certain embodiments, as the probability model gets updated with real values, the process may drop unrealistic realizations and/or create new realizations. For instance, in the above example that uses 100 realizations, the process may determine which of the 100 realizations fall within acceptable tolerance ranges and drop the realizations that are not within the acceptable tolerance ranges. As an example, if 40 realizations are not within the acceptable tolerance ranges, the process excludes these 40 realizations from the model. In one embodiment, the process may then proceed with only the realizations that are within the acceptable tolerance ranges (i.e., the other 60 realizations). In another embodiment, the process may regenerate another 40 realizations, or whatever number it may be, that are within the acceptable tolerance ranges to replace the dropped realizations. Once the new realizations are generated, the process then updates the probability of each of the cells that are in front of the drill path based on the new realizations.

The process at step 708 determines whether to make a change in the current direction of the drill path based on the probability model. For instance, in one embodiment, if the geological property values of the encountered cell are consistent with its initial prediction of success and the probability of success for cells along the current determined path have not changed, the process will continue along the current determined drill path as indicated in FIG. 8.

Figure 9:
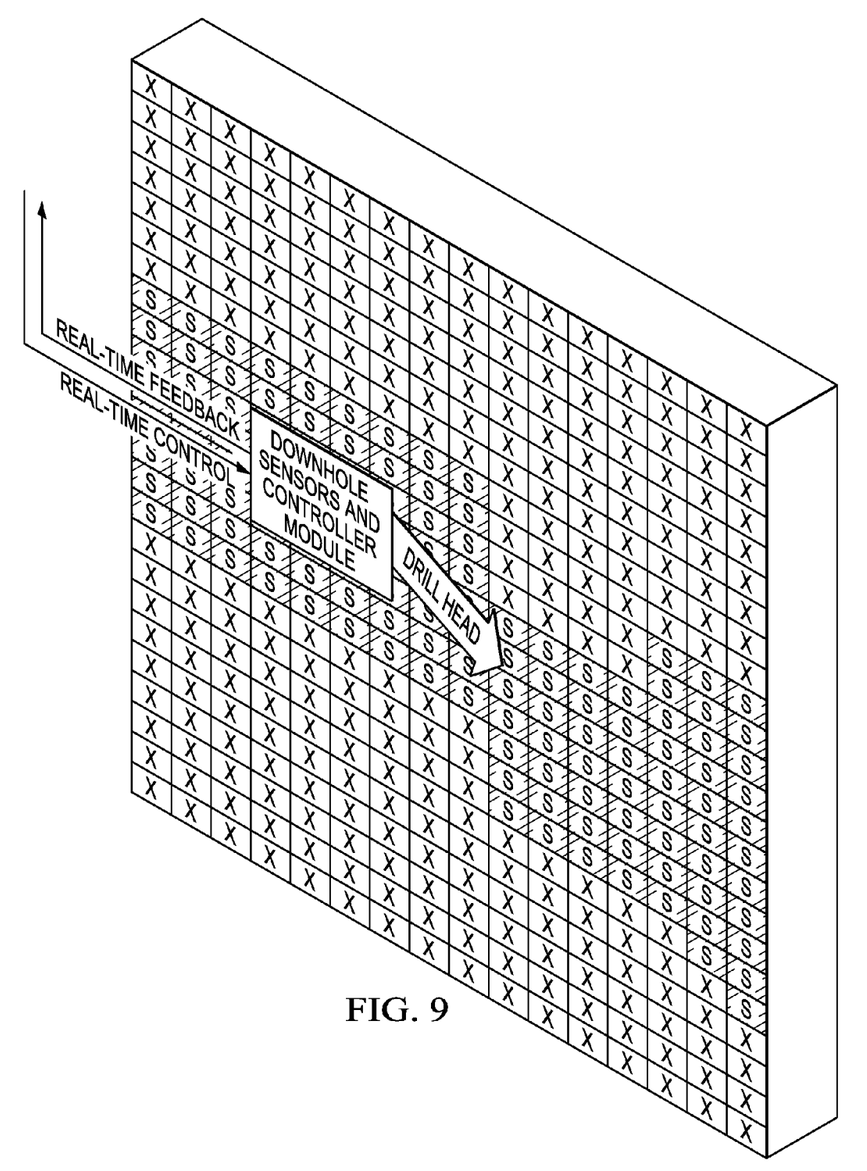
FIG. 9 illustrates an updated probability model for the portion of the drill path of FIG. 8 in accordance with the disclosed embodiments.

However, if the geological property values of the encountered cell are not consistent with its initial prediction of success or the probability of success for cells along the current determined path have switched to indicate that success is not likely to occur at these cells, the process will analyze the surrounding cells along the drill path to determine a new path based on the updated probability of success of the surrounding cells as illustrated in the example depicted in FIG. 9. In one embodiment, the process may be configured to alter the drill path, at step 710, in the direction of the closest cell that has a probability of success that exceeds a predetermined threshold (e.g., probability of success >90%). In other embodiments, the process may be configured to alter the drill path, at step 710, by proceeding in the direction of a cell having the highest probability of success among the cells within a predetermined range. Process 700 repeats until the drilling process is complete.

Thus, the disclosed embodiments provide a probabilistic approach for real time drilling that uses data gathered during the drilling operation to generate a probability model for automatically making adjustments in a drill path or for notifying a user to make adjustments in the drill path. Advantages of the disclosed embodiments include, but are not limited to, generating models that can provide very defined resolution (e.g., up to one third of a meter) for enabling precise movement within the formation and the zone of interest as opposed to current conditions that course movement within the formation and the zone of interest (e.g., 30 meters-60 meters). In addition, the disclosed process is extremely fast as the simulation can be restricted to a small number of cells (i.e., a small volume) around the drill bit end of the drill path, thus, enabling changes to be made to the direction of the drill path with very little delay.

While specific details about the above embodiments have been described, the above hardware and software descriptions are intended merely as example embodiments and are not intended to limit the structure or implementation of the disclosed embodiments. For instance, although many other internal components of the control system 100 are not shown, those of ordinary skill in the art will appreciate that such components and their interconnection are well known.

In addition, certain aspects of the disclosed embodiments, as outlined above, may be embodied in software that is executed using one or more processing units/components. Program aspects of the technology may be thought of as "products" or "articles of manufacture" typically in the form of executable code and/or associated data that is carried on or embodied in a type of machine readable medium. Tangible non-transitory "storage" type media include any or all of the memory or other storage for the computers, processors or the like, or associated modules thereof, such as various semiconductor memories, tape drives, disk drives, optical or magnetic disks, and the like, which may provide storage at any time for the software programming.

Additionally, the flowchart and block diagrams in the figures illustrate the architecture, functionality, and operation of possible implementations of systems, methods and computer program products according to various embodiments of the present invention. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Accordingly, the disclosed embodiments described herein include a method, apparatus, and computer program product for providing a probabilistic approach for real time drilling that uses data gathered during the drilling operation to generate a probability model for automatically making adjustments in a drill path. For example, one embodiment is a computer-implemented method that includes the step of creating a computer model of a formation and assigning geological property values to the plurality of cells of the model. In one embodiment, the geological property values include a porosity value, a permeability value, and a brittleness value.

The computer-implemented method also includes determining a probability of success for individual cells based on geological, petrophysical, mechanical, or any other desired property of a cell. The computer-implemented method then determines a drill path to a target zone within the formation using the probability of success determination for each cell (i.e., the probability model).

The computer-implemented method is further configured to receive real-time data during drilling of the drill path of the well and update the geological property values in an encountered cell based on the real-time data. Based on the real-time data, the method updates the probability of success for other cells. In certain embodiments, the process is configured to update only a limited number of cells along the drill path or a user-specified number of cells along the drill path. In other embodiments, the method may be configured to update the entire probability model of a formation. Additionally, in some embodiments, the method will update a bounding surface of the formation based on the real-time data and may also determining whether the target zone geologically conforms to the bounding surface.

Based on the updated probability model, the method determines whether to make a change in direction of the drill path. In certain embodiments, this determination step includes determining whether an updated probability of success for an approaching cell in a current direction of the drill path has changed from a success probability to a non-success probability. In response to a determination that the updated probability of success for the approaching cell in the current direction of the drill path has not changed from the success probability to the non-success probability, the method maintains the current direction of the drill path, otherwise, the method alters the current direction of the drill path.

In one embodiment, the computer-implemented method alters the current direction of the drill path by comparing the updated probability of success for a plurality of cells surrounding the encountered/current cell and altering the current direction of the drill path in a direction of cells having a highest updated probability of success.

The computer-implemented method repeats the above steps of receiving the real-time data for updating of the cells within the probability model to determine whether to initiate a change in direction of the drill path until the drilling process is completed.

In another embodiment, a non-transitory computer readable medium comprising computer executable instructions for providing a probabilistic approach for real time drilling that uses data gathered during the drilling operation to generate a probability model for automatically making adjustments in a drill path. The computer executable instructions that when executed causes one or more machines to perform operations comprising creating a computer model of a formation and assigning geological property values to the plurality of cells of the model. In one embodiment, the geological property values include a porosity value, a permeability value, and a brittleness value.

The computer readable medium also includes instructions for determining a probability of success for individual cells based on the geological property values and determining a drill path to a target zone within the formation using the probability of success determination for each cell.

The computer readable medium further includes instructions for receiving real-time data during drilling of the drill path of the well and updates the geological property values in an encountered cell based on the real-time data. Based on the real-time data, the instructions update the probability of success for other cells. In certain embodiments, the medium include instructions for updating only a limited number of cells along the drill path or a user-specified number of cells along the drill path. In other embodiments, the instructions update the entire probability model of a formation. Additionally, in some embodiments, the medium include instructions for updating a bounding surface of the formation based on the real-time data and may also include instructions for determining whether the target zone geologically conforms to the bounding surface.

Based on the updated probability model, the medium include instructions for determining whether to make a change in direction of the drill path. In certain embodiments, this determination step includes determining whether an updated probability of success for an approaching cell in a current direction of the drill path has changed from a success probability to a non-success probability. In response to a determination that the updated probability of success for the approaching cell in the current direction of the drill path has not changed from the success probability to the non-success probability, the instructions maintain the current direction of the drill path, otherwise, the instructions alter the current direction of the drill path.

In one embodiment, the computer readable medium includes instructions for altering the current direction of the drill path by comparing the updated probability of success for a plurality of cells surrounding the encountered/current cell and altering the current direction of the drill path in a direction of cells having a highest updated probability of success.

The computer executable instructions repeat the above steps of receiving the real-time data for updating of the cells within the probability model to determine whether to initiate a change in direction of the drill path until the drilling process is completed.

Another embodiment of the disclosure include a system that includes at least one processor and at least one memory coupled to the at least one processor and storing instructions that when executed by the at least one processor performs operations for providing a probabilistic approach for real time drilling that uses data gathered during the drilling operation to generate a probability model for automatically making adjustments in a drill path. For instance, in one embodiment, the operations include the steps of creating a computer model of a formation and assigning geological property values to the plurality of cells of the model. The operations further include determining a probability of success for individual cells based on the geological property values and determining a drill path to a target zone within the formation using the probability of success determination for each cell.

The above system embodiment may further perform operations comprising, but not limited to, receiving real-time data during drilling of the drill path of the well and updates the geological property values in an encountered cell based on the real-time data. Based on the real-time data, the operations update the probability of success for other cells. In certain embodiments, the operations include updating only a limited number of cells along the drill path or a user-specified number of cells along the drill path. In other embodiments, the operations include updating the entire probability model of a formation. Additionally, in some embodiments, the operations include updating a bounding surface of the formation based on the real-time data and may also include determining whether the target zone geologically conforms to the bounding surface.

Based on the updated probability model, the operations include determining whether to make a change in direction of the drill path. In certain embodiments, this determination step includes determining whether an updated probability of success for an approaching cell in a current direction of the drill path has changed from a success probability to a non-success probability. In response to a determination that the updated probability of success for the approaching cell in the current direction of the drill path has not changed from the success probability to the non-success probability, the operations maintain the current direction of the drill path, otherwise, the operations alter the current direction of the drill path.

In one embodiment, the operations further include altering the current direction of the drill path by comparing the updated probability of success for a plurality of cells surrounding the encountered/current cell and altering the current direction of the drill path in a direction of cells having a highest updated probability of success.

Further, the operations include repeating the above steps of receiving the real-time data for updating of the cells within the probability model to determine whether to initiate a change in direction of the drill path until the drilling process is completed.

As used herein, the singular forms "a", "an" and "the" are intended to include the plural forms as well, unless the context clearly indicates otherwise. It will be further understood that the terms "comprise" and/or "comprising," when used in this specification and/or the claims, specify the presence of stated features, integers, steps, operations, elements, and/or components, but do not preclude the presence or addition of one or more other features, integers, steps, operations, elements, components, and/or groups thereof. The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to explain the principles of the invention and the practical application, and to enable others of ordinary skill in the art to understand the invention for various embodiments with various modifications as are suited to the particular use contemplated. The scope of the claims is intended to broadly cover the disclosed embodiments and any such modification.

The invention claimed is:

1. A computer-implemented method for real-time drilling, the method comprising:

creating, by a computer system, a model of a formation, the model comprising a plurality of cells;

assigning geological property values to each of the plurality of cells of the model;

determining a probability of success for each of the plurality of cells in the model based on the geological property values assigned to that cell, the probability of success for each cell indicating a probability that a corresponding portion of the formation has geological characteristics associated with a target zone within the formation;

determining a drill path of a well to the target zone based on the probability of success determined for each cell of the model, wherein the well is drilled along the drill path using a drill string communicatively coupled to the computer system;

receiving, by the computer system, real-time data from a set of measurement tools coupled to the drill string as the well is drilled along the drill path, the set of measurement tools including one or more sensors and a transceiver unit to transmit data collected by the one or more sensors to the computer system;

updating, by the computer system, the geological property values assigned to an encountered cell of the model, based on the real-time data received for a corresponding portion of the formation along the drill path;

updating, by the computer system, the probability of success for other cells of the model, based on the updated geological property values of the encountered cell;

determining, by the computer system, whether to make a change in a current direction of the drill path, based on the updated probability of success for the other cells; and when it is determined that a change in the current direction of the drill path is to be made, transmitting, from the computer system to the transceiver unit of the set of measurement tools coupled to the drill string, control data for making the change as the well is drilled, wherein the receiving of real-time data during drilling of the drill path, the updating of the geological property values, the updating of the probability of success, the determining of whether to make a change in the current direction of the drill path, and the transmitting of control data based on the determination are repeated until the drill path is completed.

2. The computer-implemented method of claim 1, further comprising updating a bounding surface in the model of the formation based on the real-time data.

3. The computer-implemented method of claim 2, wherein the bounding surface of the model is updated to geologically conform with the target zone of the formation.

4. The computer-implemented method of claim 1, wherein determining whether to make a change in the current direction of the drill path comprises:

determining whether an updated probability of success for an approaching cell of the model corresponding to a portion of the formation in the current direction of the drill path has changed from a success probability to a non-success probability;

maintaining the current direction of the drill path when it is determined that the updated probability of success for the approaching cell in the current direction of the drill path has not changed from the success probability to the non-success probability; and determining to make a change in the current direction of the drill path when it is determined that the updated probability of success for the approaching cell has changed from the success probability to the non-success probability.

5. The computer-implemented method of claim 1, wherein transmitting comprises:

comparing the updated probability of success for a plurality of cells surrounding the encountered cell;

identifying one or more cells having a highest updated probability of success among the plurality of cells surrounding the encountered cell, based on the comparison; and transmitting control data for changing the current direction of the drill path to a direction corresponding to the one or more identified cells.

6. The computer-implemented method of claim 1, wherein the probability of success is updated for a predetermined number of the other cells along the drill path, based on the updated geological property values of the encountered cell.

7. The computer-implemented method of claim 1, wherein assigning geological property values to each of the plurality of cells of the model comprises assigning different geological property values to a plurality of realizations for each cell, and wherein determining a probability of success for each of the plurality of cells comprises determining a probability of success for each cell based on the geological property values assigned to the plurality of realizations for the cell.

8. The computer-implemented method of claim 7, wherein updating the probability of success for the other cells of the model based on the geological property values of the encountered cell includes dropping realizations that are not within a predetermine tolerance range.

9. A non-transitory computer readable medium comprising computer executable instructions for real-time drilling, the computer executable instructions when executed causes one or more computers to perform operations comprising:

creating a model of a formation, the model comprising a plurality of cells;

assigning geological property values to each of the plurality of cells of the model;

determining a probability of success for each of the plurality of cells in the model based on the geological property values assigned to that cell, the probability of success for each cell indicating a probability that corresponding portions of the formation have geological characteristics associated with a target zone within the formation;

determining a drill path of a well to the target zone based on the probability of success determined for each cell of the model, wherein the well is drilled along the drill path using a drill string communicatively coupled to the one or more computers;

receiving real-time data from a set of measurement tools coupled to the drill string as the well is drilled along the drill path, the set of measurement tools including one or more sensors and a transceiver unit to transmit data collected by the one or more sensors to the one or more computers;

updating the geological property values assigned to an encountered cell of the model, based on the real-time data received for a corresponding portion of the formation along the drill path;

updating the probability of success for other cells of the model, based on the updated geological property values of the encountered cell;

determining whether to make a change in a current direction of the drill path based on the updated probability of success for the other cells; and when it is determined that a change in the current direction of the drill path is to be made, transmitting, to the transceiver unit of the set of measurement tools coupled to the drill string, control data for making the change as the well is drilled, wherein the receiving of real-time data, the updating of the geological property values, the updating of the probability of success, the determining of whether to make a change in the current direction of the drill path, and the transmitting of control data based on the determination are repeated until the drill path is completed.

10. The computer readable medium of claim 9, wherein the operations performed by the one or more computers further comprise operations for updating a bounding surface in the model of the formation based on the real-time data.

11. The computer readable medium of claim 10, wherein the bounding surface of the model is updated to geologically conform with the target zone of the formation.

12. The computer readable medium of claim 9, wherein the operations performed by the one or more computers further comprise operations for:

determining whether an updated probability of success for an approaching cell of the model corresponding to a portion of the formation in the current direction of the drill path has changed from a success probability to a non-success probability;

maintaining the current direction of the drill path when it is determined that the updated probability of success for the approaching cell in the current direction of the drill path has not changed from the success probability to the non-success probability; and determining to make a change in the current direction of the drill path when it is determined that the updated probability of success for the approaching cell has changed from the success probability to the non-success probability.

13. The computer readable medium of claim 9, wherein the operations performed by the one or more computers further comprise operations for:

comparing the updated probability of success for a plurality of cells surrounding the encountered cell;

identifying one or more cells having a highest updated probability of success among the plurality of cells surrounding the encountered cell, based on the comparison; and transmitting control data for changing the current direction of the drill path to a direction corresponding to the one or more identified cells.

14. A system, comprising:
at least one processor; and
at least one memory coupled to the at least one processor and storing instructions
that when executed by the at least one processor performs operations comprising:
creating a model of a formation, the model comprising a plurality of cells;
assigning geological property values to each of the plurality of cells of the model;
determining a probability of success for each of the plurality of cells in the model based on the geological property values assigned to that cell, the probability of success for each cell indicating a probability that corresponding portions of the formation have geological characteristics associated with a target zone within the formation;

determining a drill path of a well to the target zone based on the probability of success determined for each cell of the model, wherein the well is drilled along the drill path using a drill string communicatively coupled to the at least one processor;

receiving real-time data from a set of measurement tools coupled to the drill string as the well is drilled along the drill path, the set of measurement tools including one or more sensors and a transceiver unit to transmit data collected by the one or more sensors to the at least one processor;

updating the geological property values assigned to an encountered cell of the model, based on the real-time data received for a corresponding portion of the formation along the drill path;

updating the probability of success for other cells of the model, based on the updated geological property values of the encountered cell;

determining whether to make a change in a current direction of the drill path based on the updated probability of success for the other cells; and when it is determined that a change in the current direction of the drill path is to be made, transmitting, to the transceiver unit of the set of measurement tools coupled to the drill string, control data for making the change as the well is drilled, wherein the receiving of real-time data, the updating of the geological property values, the updating of the probability of success, the determining of whether to make a change in the current direction of the drill path, and the transmitting of control data based on the determination are repeated until the drill path is completed.

15. The system of claim 14, wherein the operations performed by the at least one processor further comprise operations for updating a bounding surface of the formation based on the real-time data.

16. The system of claim 15, wherein the bounding surface of the model is updated to geologically conform with the target zone of the formation.

17. The system of claim 14, wherein the operations performed by the at least one processor further comprise operations for:

determining whether an updated probability of success for an approaching cell of the model corresponding to a portion of the formation in the current direction of the drill path has changed from a success probability to a non-success probability;

maintaining the current direction of the drill path when it is determined that the updated probability of success for the approaching cell in the current direction of the drill path has not changed from the success probability to the non-success probability; and determining to make a change in the current direction of the drill path when it is determined that the updated probability of success for the approaching cell has changed from the success probability to the non-success probability.

18. The system of claim 17, wherein the operations performed by the at least one processor further comprise operations for:

comparing the updated probability of success for a plurality of cells surrounding the encountered cell;

identifying one or more cells having a highest updated probability of success among the plurality of cells surrounding the encountered cell, based on the comparison; and transmitting control data for changing the current direction of the drill path to a direction corresponding to the one or more identified cells.

19. The system of claim 14, wherein the probability of success is updated for a predetermined number of the other cells along the drill path, based on the updated geological property values of the encountered cell.

20. The system of claim 14, wherein the operations performed by the at least one processor further comprise operations for:

assigning different geological property values to a plurality of realizations for each cell in the plurality of cells of the model;

determining a probability of success for each cell in the plurality of cells, based on the geological property values assigned to the plurality of realizations for the cell; and updating the probability of success for the other cells of the model based on the geological property values of the encountered cell by dropping realizations that are not within a predetermine tolerance range and generating new realizations to replace the dropped realizations.

* * * * *